United States Patent
Della Porta

(10) Patent No.: US 11,851,257 B2
(45) Date of Patent: Dec. 26, 2023

(54) PACKAGE FOR FOOD AND RELATED METHOD OF PACKAGING

(71) Applicant: GIUSEPPE CITTERIO SALUMIFICIO S.P.A., Rho (IT)

(72) Inventor: Umberto Della Porta, Milan (IT)

(73) Assignee: GIUSEPPE CITTERIO SALUMIFICIO S.P.A., Rho (IT)

( * ) Notice: Subject to any disclaimer, the term of this patent is extended or adjusted under 35 U.S.C. 154(b) by 0 days.

(21) Appl. No.: 17/905,678

(22) PCT Filed: Mar. 9, 2021

(86) PCT No.: PCT/IB2021/051952
§ 371 (c)(1),
(2) Date: Sep. 6, 2022

(87) PCT Pub. No.: WO2021/181271
PCT Pub. Date: Sep. 16, 2021

(65) Prior Publication Data
US 2023/0109321 A1  Apr. 6, 2023

(30) Foreign Application Priority Data

Mar. 9, 2020 (IT) .................. 102020000004924

(51) Int. Cl.
*B65D 81/28* (2006.01)
*B65D 77/00* (2006.01)
(Continued)

(52) U.S. Cl.
CPC .......... *B65D 77/003* (2013.01); *B65B 25/067* (2013.01); *B65B 31/048* (2013.01);
(Continued)

(58) Field of Classification Search
CPC ........................ B65D 77/033; B65D 77/0433; B65D 81/203; B65D 81/2092; B32B 2439/70; B65B 31/00
(Continued)

(56) References Cited

U.S. PATENT DOCUMENTS 3,429,432 A * 2/1969 Cabernoch ............. A61B 50/30
206/370
4,548,852 A * 10/1985 Mitchell ................ B65D 21/08
426/392
(Continued)

FOREIGN PATENT DOCUMENTS

EP            3184453 A1    6/2017

OTHER PUBLICATIONS

International Search Report and Written Opinion for Corresponding International Application No. PCT/IB2021/051952, 10 pages, dated Jun. 14, 2021.

*Primary Examiner* — Luan K Bui
(74) *Attorney, Agent, or Firm* — LUCAS & MERCANTI, LLP

(57) ABSTRACT

A food package having a heat-sealed cover composed of a lower plastic film and an upper plastic film which is distinct and separate from the lower plastic film is disclosed. The upper and lower films are collapsible, i.e., they can be creased and crumpled into a ball without effort or folded as a tissue paper. The lower film and upper film are heat-sealed to each other at respective perimeter edges to define a closed, watertight internal housing filled with a modified atmosphere. A tray, configured to house the food product, is inserted in the closed internal housing but is not fixed to the upper or lower film. The food packaging described herein allows a substantial reduction of plastic compared to those currently on the market, while guaranteeing its mechanical
(Continued)

rigidity, and the long-term quality of the product. A method for producing the packaging is also disclosed.

8 Claims, 4 Drawing Sheets

(51) Int. Cl.
*B65B 25/06* (2006.01)
*B65B 31/04* (2006.01)
*B65B 41/12* (2006.01)
*B65D 75/30* (2006.01)
*B65D 81/20* (2006.01)

(52) U.S. Cl.
CPC .............. *B65B 41/12* (2013.01); *B65D 75/30* (2013.01); *B65D 81/203* (2013.01); *B65D 81/2092* (2013.01)

(58) Field of Classification Search
USPC ...... 206/213.1, 557; 426/106, 118, 124, 133
See application file for complete search history.

(56) References Cited

U.S. PATENT DOCUMENTS

| | | | | |
|---|---|---|---|---|
| 5,698,250 A | * | 12/1997 | DelDuca | B65D 77/003 426/396 |
| 6,054,153 A | * | 4/2000 | Carr | B65D 81/268 206/557 |
| 6,112,890 A | * | 9/2000 | Colombo | B65D 77/225 206/213.1 |
| 7,938,263 B2 | * | 5/2011 | Vijay | B65D 75/12 229/87.01 |
| 2005/0112245 A1 | | 5/2005 | Delduca et al. | |
| 2006/0147588 A1 | | 7/2006 | Garwood | |
| 2014/0284229 A1 | * | 9/2014 | Newman | A45C 11/046 206/213.1 |
| 2016/0200501 A1 | * | 7/2016 | Lee | B65D 81/2023 53/433 |
| 2018/0029766 A1 | | 2/2018 | Chung et al. | |

\* cited by examiner

PACKAGE FOR FOOD AND RELATED METHOD OF PACKAGING

CROSS-REFERENCE TO RELATED APPLICATIONS

This application is a 371 of PCT/IB2021/051952, filed Mar. 9, 2021, which claims the benefit of Italian Patent Application No. 102020000004924, filed Mar. 9, 2020.

TECHNICAL FIELD

The present disclosure refers in general to packaging for food products and more particularly to a packaging suitable for containing cured meats in a protected atmosphere, as well as a relative packaging method.

BACKGROUND

A typical food package available on the market, such as the one in FIG. 1, is made by means of a "flow pack" type machine and contemplates a single sheet of plastic film folded on itself around the food product. The so obtained package requires three welding zones A, B1, B2: one (A) to join the laminate with itself and two (B1, B2) to close the ends of the package. The food product, in case it needs a support, can be supported by a tray, which is then also inserted inside the package. This type of very common packaging can be filled with modified atmosphere if necessary, but this technology does not allow sufficient evacuation of oxygen to guarantee the quality of sliced food products, which even in presence of moderate quantities of oxygen in the modified atmosphere inside the package may change colour and flavour due to oxidative processes.

Furthermore, these oxygen residues may differ from package to package and it is thus difficult to guarantee the quality of the packaged product over a long period and on different samples. Finally, the welding is weak at the joints, and this can favour micro leaks that may cause in a short time an increase of residual oxygen inside the package and thus a rapid deterioration of the product.

In order to obviate these problems, particularly felt for example in the case of packaging of sliced meats, packages for food products such as that of FIG. 2a made through a thermoforming machine are used. During this packaging process, a vacuum is created inside the package before injecting a modified atmosphere, obtaining a protected atmosphere inside. In this way it is possible to reduce residual oxygen percentages by an order of magnitude, and thus to obtain a better conservation of the product.

The package of this type includes a lower tray V in thermoformed plastic material with a thickness not smaller than 200 micrometers. This thickness is necessary for having a rigid tray, as shown in the sectional view of FIG. 2b, that does not to bend due to the weight of food when a consumer picks it up. The tray containing a food products is then closed with an upper plastic film which typically has a thickness of no less than 80 micrometers and which is welded onto an edge of the underlying tray. Since the tray is rigid, the plastic film remains substantially flat and does not rest on the bottom of the tray.

However, in order to give the desired stiffness, a significant amount of plastic material is used. Furthermore, the plastic material of the lower tray is generally not recyclable because it is composed of several layers of different plastic films coupled together (typically a layer for stiffness, a layer for UV and oxygen barrier and a layer that welds with the other film).

US2006/0147588 shows in FIG. 79 an outer cover having a lower part which is a rigid tray intended to contain pieces of meat, which are relatively heavy. It is to be remarked in particular that the lower part 3722 is rigid and cannot collapse, because it supports both the closed trays containing the product without changing its shape and the upper part 3732 which does not rest on the content 3726. The lower film, in this case, is flexible but not collapsible, i.e. it cannot be creased and crumpled into a ball with hands without any effort or folded more easily than a paper tissue.

US2005/0112245 shows a cover not composed of two collapsible films, but of a single film folded on itself and sealed at the edges. The cover is inflated, as in the package of FIG. 1, so as to define a housing much larger than the containment volume of the internal tray. The final appearance of the package is noticeably different from that of ordinary trays for sliced food, which is what it is desired to reproduce. This is due to a wise use of a thermoformed film, which makes the shape of the external packaging much more suitable for that of the internal tray than a bag. Furthermore, in this case, using a thermoforming machine instead of the machine of FIG. 5 in US2005/0112245, the production speed is much higher and the oxygen residues in the outer pack are lower than those obtained in the patent description. More precisely, using a thermoforming machine, which is able to make a vacuum up to 10 mbar instead of the 372 mbar of the machine in FIG. 5 in US2005/0112245, and thanks to the fact that the inner pack does not have a lid, unlike the one described in US2005/0112245, the oxygen residues are much lower than those described in the patent. In fact, as stated at paragraph [0057], "Taking into account any oxygen disposed within the inner package 14, i.e., oxygen disposed within the meat 26 itself, the wall of the tray 16, and the free space beneath the stretch film 18, the oxygen level in the pocket 13 of no less than about 0,1 percent corresponds to an 'equilibrium' oxygen level in the entire package 10 of no less than one to two percent". The package and packaging procedures presented in this application allow to reduce oxygen residues below 0.1% from the moment the pack is closed, thus also avoiding the use of oxygen scavengers.

Both packaging of patents US2006/0147588 and US2005/0112245 are composed of an "internal packaging", also called "finished package" in US2006/0147588, and an "external packaging" (which serves to preserve the product during the journey from manufacturer to distributor), also called "master container" in US2006/0147588. The difference is that, in these cases, the "internal packaging" is a closed container which is the packaging of the product for the final consumer. The inner tray of the packaging disclosed in the present document is a tray without a lid, it cannot be sold without the outer packaging (the thermoformed plastic bag). Therefore, the package, as it reaches a consumer, in the case of packages presented in US 2006/0147588 and US2005/0112245 is very different from the package of the present description.

SUMMARY

An objective of the present invention is to provide a package for food products which:

guarantees the same conservation and quality on the expiry date of the product, typical of the trays for cured meats currently on the market produced with a thermoforming machine;

is made with a reduced use of plastic material, such as packages that can be produced with a flow pack machine;

preserves a soft and fragrant consistency of the product, as well as its colour and flavour, thanks to the modified atmosphere;

has the same mechanical rigidity as the trays currently in use, such as the packages that can be produced with a thermoforming machine, or with a flow pack machine thanks to the insertion of an internal tray.

A further object of the present invention is to provide a packaging process for the aforementioned food package which is easy to adopt in the production lines currently in use.

These objects are achieved with a food package the main characteristics of which are specified in the enclosed claims. The claims as filed are integral part of this specification and are incorporated herein by reference.

DETAILED DESCRIPTION

Figure 4A:
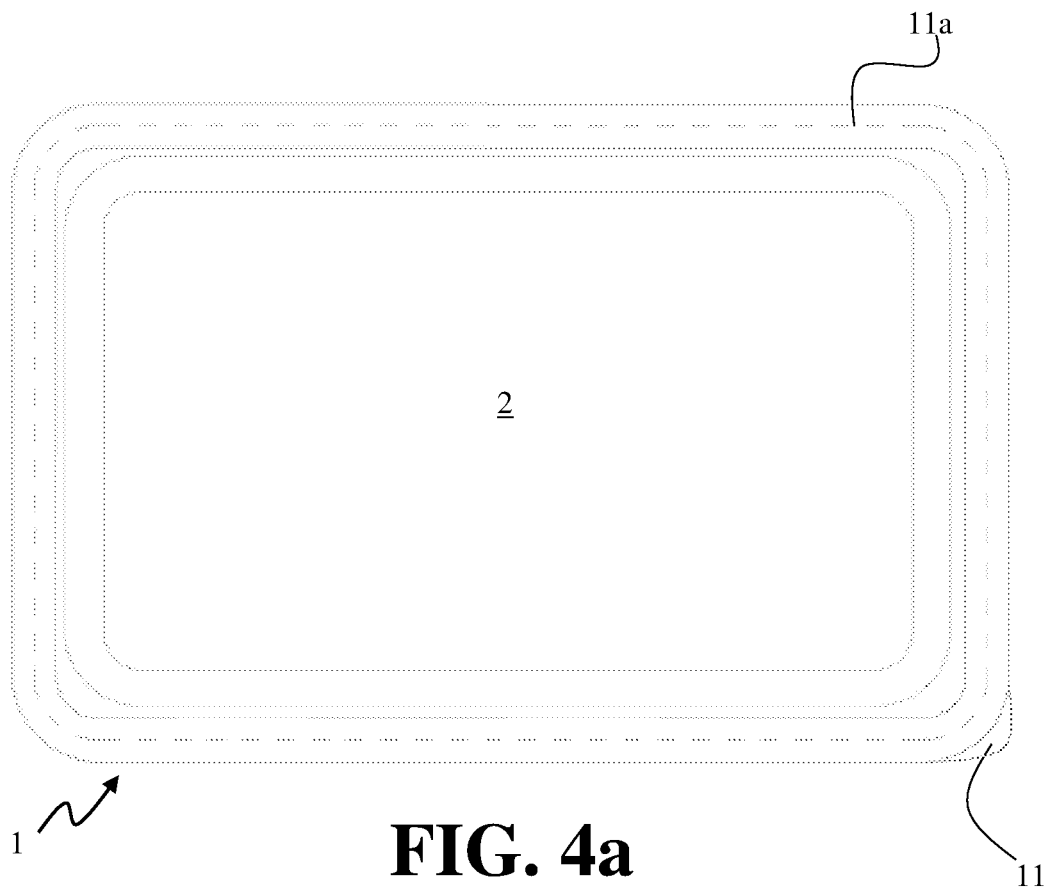
FIG. 4a shows a package according to the present disclosure obtained by inserting a tray made of recyclable or compostable material in a lower thermoformed plastic film closed with an upper plastic film welded thereto.
Figure 4B:
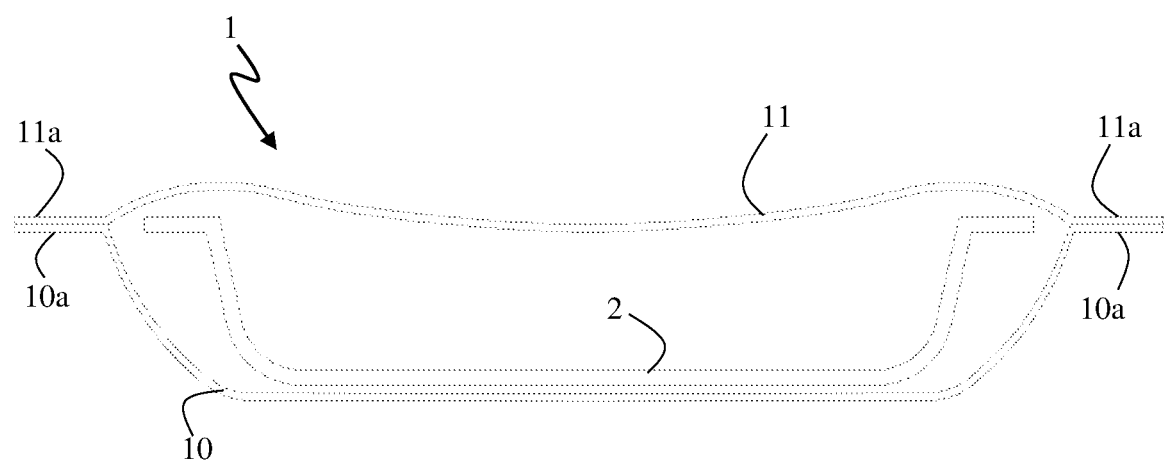
FIG. 4b is a sectional view of the package of FIG. 4a showing a tray with raised edges, a lower thermoformed plastic film and an upper plastic film welded to the lower plastic film.

FIGS. 4a and 4b depict a food package comprising a welded cover 1 and a tray 2 configured to be inserted inside the welded cover 1 and to contain food. The tray has a bottom and raised edges with respect to the bottom having a nominal height, so as to define together a volume for containing the food product inside the tray 2. The welded cover 1 comprises a lower plastic film 10 and an upper plastic film 11 distinct and separate from the lower plastic film 10. These used films are produced by coupling one or more plastic films chosen the set, by way of example but not limited to, consisting of polyethylene terephthalate (PET), polyethylene (PE), polypropylene (PP) or combinations thereof and by adding an oxygen and UV barrier.

According to one aspect, the lower plastic film 10 and the upper plastic film 11 are preferably composed of the same material. According to one aspect, the lower plastic film 10 and the upper plastic film 11 have different thicknesses and optionally also a barrier to oxygen and UV rays which can affect in different percentages.

Furthermore, the lower plastic film 10 and the upper plastic film 11 have materials and thicknesses of such dimensions as to make them both collapsible, that is, they lack sufficient rigidity to keep their shape intact when held cantilevered at only one end. In other words, the considered films can be creased and crumpled into a ball with bare hands without effort. The reduced thickness makes it possible to greatly reduce the amount of plastic material necessary for the production of the food package according to this disclosure. In this way, the external films have only the function of protecting the food product from the outside, from oxygen and UV rays.

According to one aspect, the lower plastic film 10 has a thickness of between 20 micrometers and 140 micrometers, and the upper plastic film 11 has a thickness of between 20 micrometers and 80 micrometers. Tests carried out by the Applicant have shown that the use of a thermoforming machine allows the food to be packaged, reaching a residual oxygen content of less than 0.1% inside the package, which allows the appearance of the sliced meats to be kept practically unaltered until the expiry date.

The lower plastic film 10 and the upper plastic film 11 are welded to each other at respective perimeter edges 10a, 11a so as to form the welded cover 1 and to define a closed, watertight internal housing. Welding is preferably carried out with a heat-sealing process, but other equivalent methods are possible such as, by way of example but not limited to, ultrasonic welding.

As shown in FIGS. 4a and 4b, the tray 2 is inserted in this closed internal housing and is not fixed to the lower plastic film 10 or to the upper plastic film 11; in other words, tray 2 is trapped in the closed watertight housing. The tray 2 is not collapsible, that is, if cantilevered held at one end it is at least capable of supporting its own weight and maintaining its shape. Furthermore, the tray 2 is configured to support the weight of the food product that is housed therein so that a buyer can lift the food package according to the present disclosure and the food package does not collapses under the weight of the food product contained therein.

Figure 1:
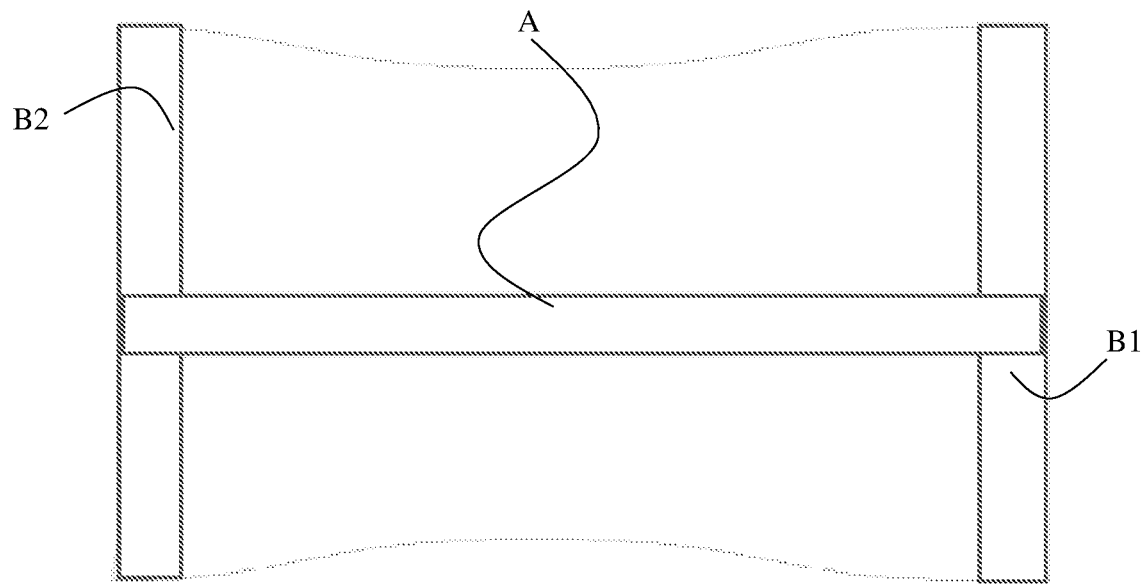
FIG. 1 shows a "flow pack" type food package obtained by wrapping a product with a single sheet of plastic film and sealing the free edges of the plastic film two by two to seal the product inside.
Figure 2A:
FIG. 2a shows a typical pack for cold cuts containing a modified atmosphere, having a thick and thermoformed lower plastic film configured to withstand its own weight and the weight of the contained food without collapsing and an upper plastic film welded thereto at the edges.
Figure 2B:
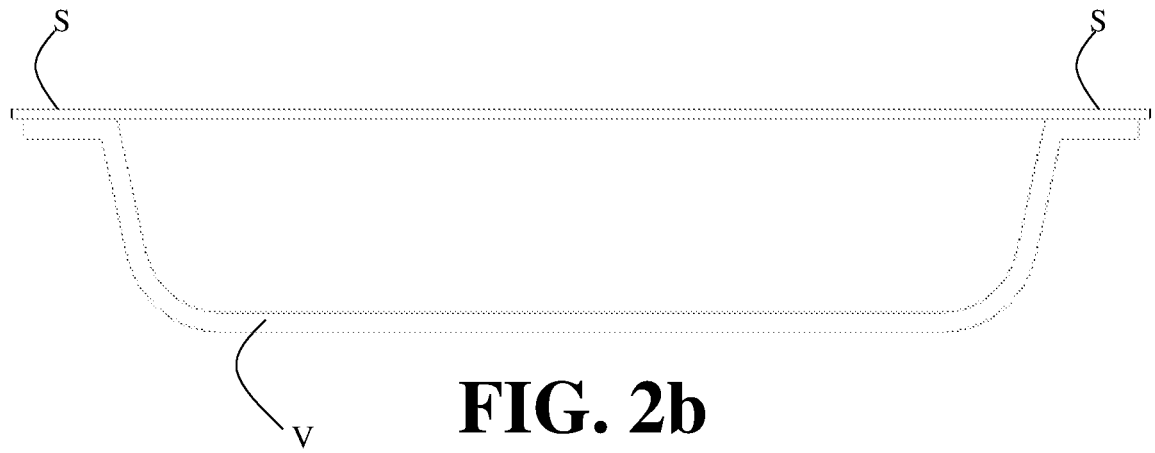
FIG. 2b is a sectional view of the package of FIG. 2a, wherein the thick lower plastic film by itself maintains the shape of the tray and keeps the upper plastic film taut.
Figure 3:
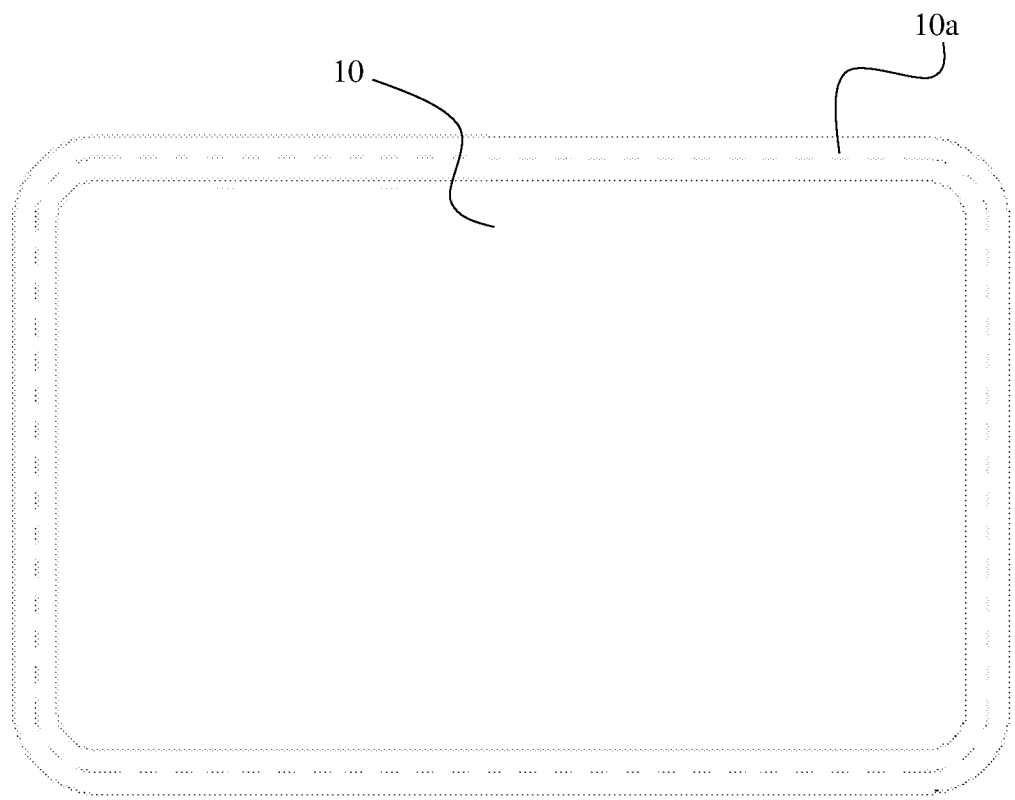
FIG. 3 shows a collapsible lower plastic film, which can be crumpled into a ball with bare hands without any effort.

According to one aspect, the lower plastic film 10 is advantageously thermoformed to better adapt to the shape of the tray 2. Alternatively or in addition, the upper plastic film 11 can be thermoformed. According to one aspect, the lower plastic film 10 is thermoformed so that the watertight internal housing has a volume comparable to the containment volume of the tray 2, with the lower thermoformed plastic film 10 enveloping the outer surface of the tray. As shown in FIG. 4b, the upper plastic film 11 will be conveniently configured to rest against the edges of tray 2 and to be supported by the raised edges of tray 2, remaining cantilevered suspended above the bottom of tray 2. In this way, the complete package will have the appearance of common trays for cold cuts, like the one shown in FIG. 2, but with a much thinner lower plastic film 10.

Given the collapsibility of the lower plastic film 10 and of the lower plastic film 11, the shape of the outer cover could change substantially due to the force of gravity or other external forces. The shape of the pack for cured meats described in this document is thus preserved by the internal tray, by its shape and its mechanical strength.

Furthermore, the perimetral welding between the upper plastic film 11 and the lower plastic film 10 is configured to abut against the raised edges of the tray, keeping the upper plastic film 11 substantially flat, preventing it from lying on the bottom of the tray 2.

According to one aspect, the tray 2 is made, by way of example but not limited to, of paper or of compostable material.

According to one aspect, the paper-based tray is coated with a light polymer layer or another barrier to protect the paper from moisture.

According to one aspect, the watertight internal housing of the food package, after having been made under vacuum, is filled with a modified atmosphere suitable for food preservation.

A welded cover 1 with these characteristics has the advantage of having low oxygen residues inside the package, thus the quality of the product can be preserved for a long time. Furthermore, the food package comprising the welded cover 1 and the tray 2 preserves the rigidity and properties of trays for cold cuts available on the market produced with a thermoforming machine, and at the same time reduces consumption of plastic, as in the packages produced with a flow pack machine.

The fact of not having an oxygen permeable lid on the tray containing the product allows to realize better vacuum conditions and to have oxygen residues in the air around the product of less than 0.1% already when the package is sealed.

Figure 5:
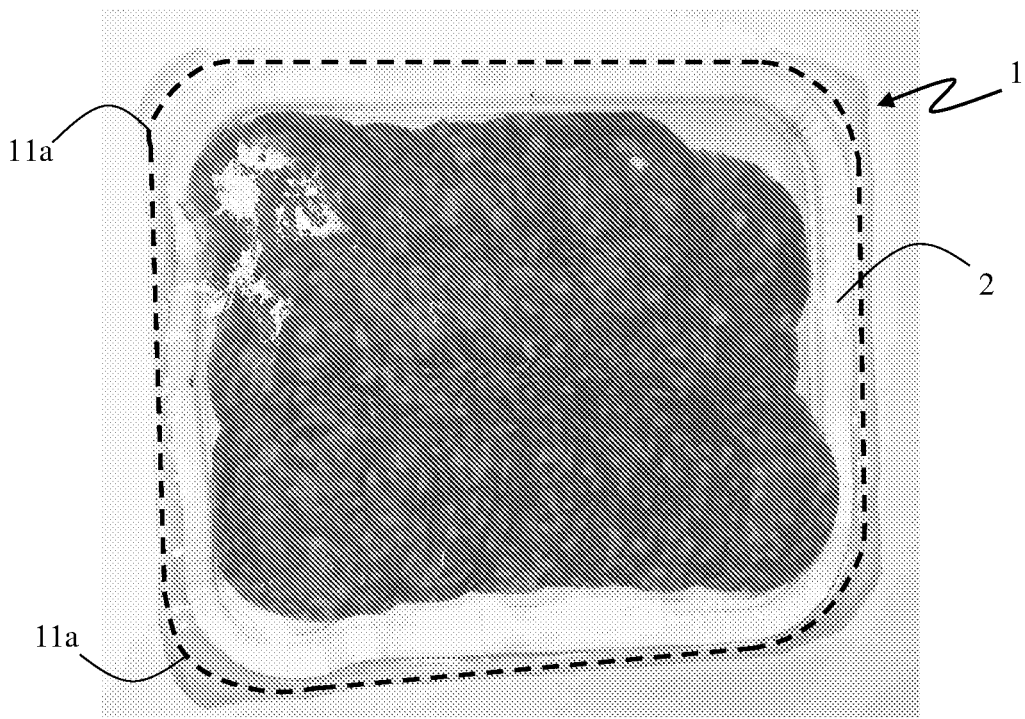
FIG. 5 is an image of a package as in FIG. 4a with some food product and ready to be sold.
Figure 6:
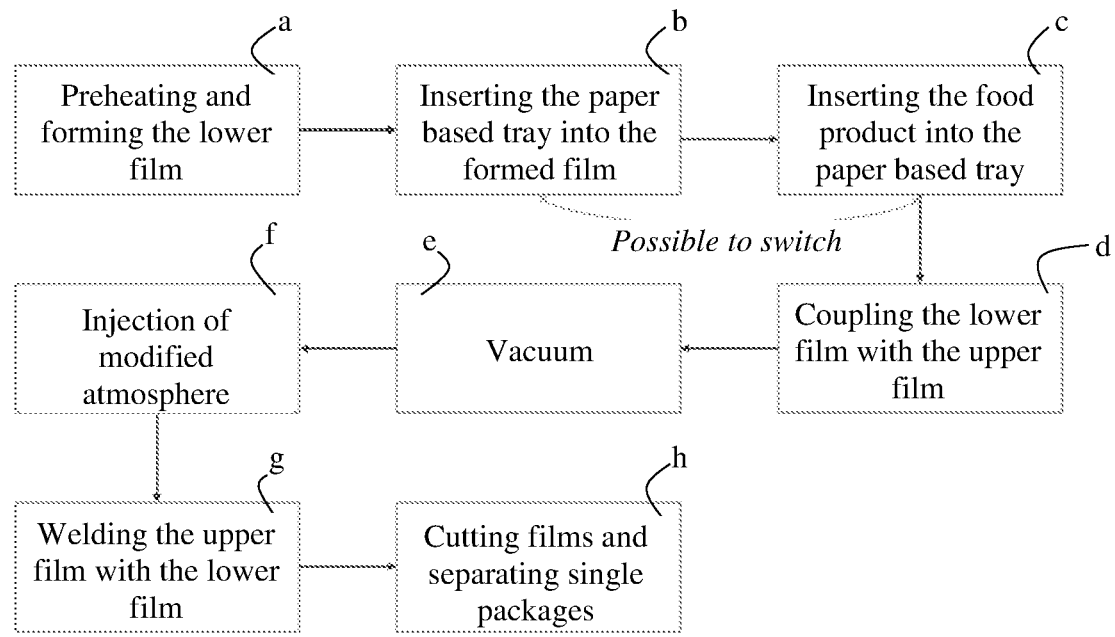
FIG. 6 shows a method according to the present disclosure for the production of food packages of FIGS. 4a and 4b.

Referring to FIG. 6, the process for producing a food package according to the present disclosure, an example of which is depicted in FIG. 5, comprises the following steps:
a. providing a collapsible lower plastic film 10 with a thickness between 20 micrometers and 140 micrometers and proceeding with the process of forming a portion of this film, if this is necessary to contain tray 2;
b. inserting the tray 2 into this lower plastic film 10;
c. inserting the food product into the tray 2;
d. providing an upper plastic film 11 with a thickness between 20 micrometers and 80 micrometers, which can be collapsed, and superimpose a portion thereof on a corresponding formed portion of the lower plastic film 10 containing the tray 2 and the product. The respective perimeter edges 10a, 11a are superimposed defining an internal housing of the package;
e. sucking atmospheric air between the two portions of the plastic films 10, 11 placing the internal housing under vacuum. In this way, oxygen is eliminated from inside the package;
f. injecting modified atmosphere for food in the housing under vacuum;
g. welding the upper plastic film 11 to the lower plastic film 10 at the respective perimeter edges 10a, 11a so as to define a watertight internal housing containing the tray 2 with the product;
h. cutting the plastic films 10, 11 in order to obtain the individual food packages.

Alternatively, in step a) it is possible to carry out the forming operation only on the upper film 11 or on both the lower film 10 and the upper film 11.

It is understood that steps b) and c) can be switched. The tray 2 supports its own weight and the weight of the food placed inside, thus it can be placed on the lower laminated plastic film 10, before or after the insertion of the food into the tray itself.

The embodiment of the method of this disclosure shown in FIG. 6 refers to the case in which the upper plastic film 11 is taken from a first continuous film roll and the lower plastic film 10 is taken from a second continuous film roll. Consequently, after the two upper and lower films are welded together (step g), they must be cut (step h), in correspondence with the respective perimeter edges in order to separate the single packages.

Although less preferred, the latter operation could theoretically be avoided by providing a pre-cut upper plastic film 11 and a pre-cut lower plastic film 10 having suitable length. The food package according to the present disclosure has the advantage of reducing more than 65% the used amount of plastic material than a thermoformed package according to the prior art, while maintaining the necessary rigidity of the package thanks to the internal tray. A further advantage is the fact that this tray 2 is recyclable or compostable.

Furthermore, the packaging process according to this disclosure allows to preserve the best quality of the product thanks to the reduced percentages of oxygen present inside the obtained package.

Advantageously, the food package according to the present disclosure does not require the lower plastic film to comprise a layer of a different material suitable for imparting rigidity to the package. In this way, not only is the lower film more easily recyclable, but it is also possible to use a lower film and an upper film based on the same plastic material, thus improving the ease of recycling of the welded cover 1 as a whole.

Finally, the process can be easily adopted in the production lines that are currently in use for the production of rigid thermoformed tray packages.

The present invention has been described up to now with reference to its preferred embodiments. It is to be understood that there may be other embodiments that pertain to the same inventive core, all comprised within the scope of the claims set out below.

The invention claimed is:

1. A food packaging, including:
a welded cover composed of a lower plastic film and an upper plastic film distinct and separate from said lower plastic film, said upper and lower films having thicknesses and being composed of materials to be collapsible and to be creased and crumpled with bare hands into a ball or folded as a paper tissue, and being welded together at respective perimeter edges so as to define a perimetral sealing and a watertight internal housing, wherein said lower plastic film has a thickness of between 20 micrometers and 140 micrometers, and said upper plastic film has a thickness of between 20 micrometers and 80 micrometers;
a non-collapsible tray inserted in said watertight internal housing, detached from said lower film and said upper film, trapped in said watertight internal housing, said non-collapsible tray being configured to house the food product and to support its weight, said non-collapsible tray having a bottom and raised edges in respect to the bottom and having a nominal height and defining together a containment volume of the food product inside the tray;
wherein said watertight internal housing is filled with a modified atmosphere suitable for food packaging;
wherein said lower plastic film is thermoformed to contain said non-collapsible tray so that the watertight internal housing has a volume corresponding to the containment volume of the non-collapsible tray with the lower plastic film wrapping an outer surface of the non-collapsible tray, the upper plastic film remaining suspended above the bottom of the non-collapsible tray.

2. The food packaging according to claim 1, wherein said lower plastic film and upper plastic film are of the same material, but with different thicknesses and with an oxygen and UV barrier.

3. The food packaging according to claim 1, wherein said non-collapsible tray is based on paper or compostable material.

4. The food packaging according to claim 1, wherein said upper plastic film and said lower plastic film are films made of a material selected from the group consisting of polyethylene terephthalate, polyethylene, polypropylene and combinations thereof.

5. A method for producing a food packaging of claim 1, comprising:
   providing the lower plastic film and the upper plastic film distinct and separate from said lower plastic film, said upper and lower films having thicknesses and materials to be collapsible;
   inserting the non-collapsible tray with the food product between said lower plastic film and said upper plastic film superimposed on each other so as to define the watertight internal housing of the package;
   aspirating air between said lower plastic film and said upper plastic film superimposed on one another for placing said watertight internal housing under vacuum;
   introducing modified atmosphere for food into said watertight internal vacuum housing;
   welding said upper plastic film to said lower plastic film in correspondence with respective matching perimeter edges to define the watertight internal housing; and
   thermoforming said lower plastic film or said upper plastic film before inserting said non-collapsible tray between said lower plastic film and said upper plastic film.

6. The method according to claim 5, wherein said upper plastic film is taken from a first continuous film roll and said lower plastic film is taken from a second continuous film roll, said method further comprising cutting said upper plastic film and said lower plastic film welded together, in correspondence of the corresponding matching perimeter edges.

7. The food packaging according to claim 1, wherein the upper plastic film is configured to lay onto the edges of the non-collapsible tray and to be sustained by the raised edges of the non-collapsible tray.

8. The food packaging according to claim 1, wherein said upper plastic film is thermoformed.

* * * * *